FIG. I

INVENTOR.
J. H. AUER JR.
BY Forest B. Hitchcock
HIS ATTORNEY

April 2, 1968     J. H. AUER, JR     3,376,547
PARKING AREA SCANNING SYSTEM
Filed Oct. 20, 1964

INVENTOR.
J. H. AUER JR.
HIS ATTORNEY

United States Patent Office 3,376,547
Patented Apr. 2, 1968

3,376,547
PARKING AREA SCANNING SYSTEM
John H. Auer, Jr., Fairport, N.Y., assignor to General Signal Corporation, Rochester, N.Y., a corporation of New York
Filed Oct. 20, 1964, Ser. No. 405,070
15 Claims. (Cl. 340—51)

ABSTRACT OF THE DISCLOSURE

Apparatus for indicating the location of vacant parking places within a parking facility. A number of transducers, which are disposed throughout the parking facility and each of which monitors a particular parking place, are combined to operate with a single transceiver. This transceiver is selectively connected to each of said transducers, in turn, by switching circuits and as each parking place is monitored a corresponding indicator is made to register that place as occupied or vacant.

---

This invention relates to system for remotely determining occupancy of parking spaces within a parking facility, and more particularly to a system for scanning parking spaces within a parking facility using a plurality of ultrasonic transducer units with a minimum of transceivers.

In parking facilities having sufficient accommodation for a large number of vehicles, it is highly desirable to rapidly direct each incoming vehicle to a vacant parking space without need of a parking attendant visually checking the actual facility and directing the incoming vehicles accordingly. Heretofore, however, this has been impractical, due to the high cost of an installation having a separate vehicle detector for each parking space. Numerous systems for directing vehicles to vacant parking spaces by maintaining a running count of the total number of vehicles within the facility, or a section thereof, have become well known. However, such systems have been characterized by erroneous indications, due to errors in counting. Once an error has been made, it is retained until the system is reset.

Thus it is desirable to devise a low cost, accurate system for keeping track of vacant parking spaces within a parking facility. The parking spaces may be readily monitored by ultrasonic detection means. It will be noted that a typical ultrasonic vehicle detector, such as that described in H. C. Kendall et al. Patents 3,042,303 and 3,042,899, issued July 3, 1962, and in J. H. Auer, Jr. Patent 3,045,909 issued July 24, 1962, comprises transceiver means for generating electrical signals to be transformed into vibrational energy pulses and for receiving electrical signals corresponding to reflected vibrational energy pulses. In addition to the transceiver, transducer units are required for converting the generated electrical energy pulses into vibrational energy pulses for outward propagation from the transducer means, and for converting reflected vibrational energy pulses which impinge on the transducer means into electrical energy signals for providing output indications from the transceiver. Each tarnsducer unit may include either separate transmitting and receiving transducers, or a single transducer for both transmitting and receiving.

Therefore, the present invention is concerned with a low cost system for automatically monitoring the occupancy of every parking space within a large parking facility. This is accomplished through use of separate ultrasonic transducer means for each parking space in combination with a single transceiver for a plurality of transducers. Each transceiver is periodically coupled to each separate transducer means, and provides an output indication of the occupancy of each parking space at the time the space is scanned, which indication is retained until the space is scanned once again.

One object of this invention is to provide a system for repetitively scanning all parking spaces within a parking facility.

Another object is to provide means for driving a plurality of ultrasonic transducers from a single ultrasonic transceiver.

Another object is to provide scanning means for selectively coupling a single transmitting and receiving ultrasonic transducer unit to a single ultrasonic transceiver in a repetitive manner.

The invention contemplates means for periodically scanning all parking spaces within a parking facility comprising a plurality of ultrasonic transmitting and receiving transducer units, each transmitting and receiving transducer unit being situated to monitor a single parking space, a single transceiver adapted to operate in combination with any single transmitting and receiving transducer unit at any given instant, and switching means sequentially coupling each of the transmitting and receiving transducer units separately to the transceiver.

The foregoing and other objects and advantages of the invention will become apparent from the following detailed description when read in conjunction with the accompanying drawings, in which.

Figure 1:
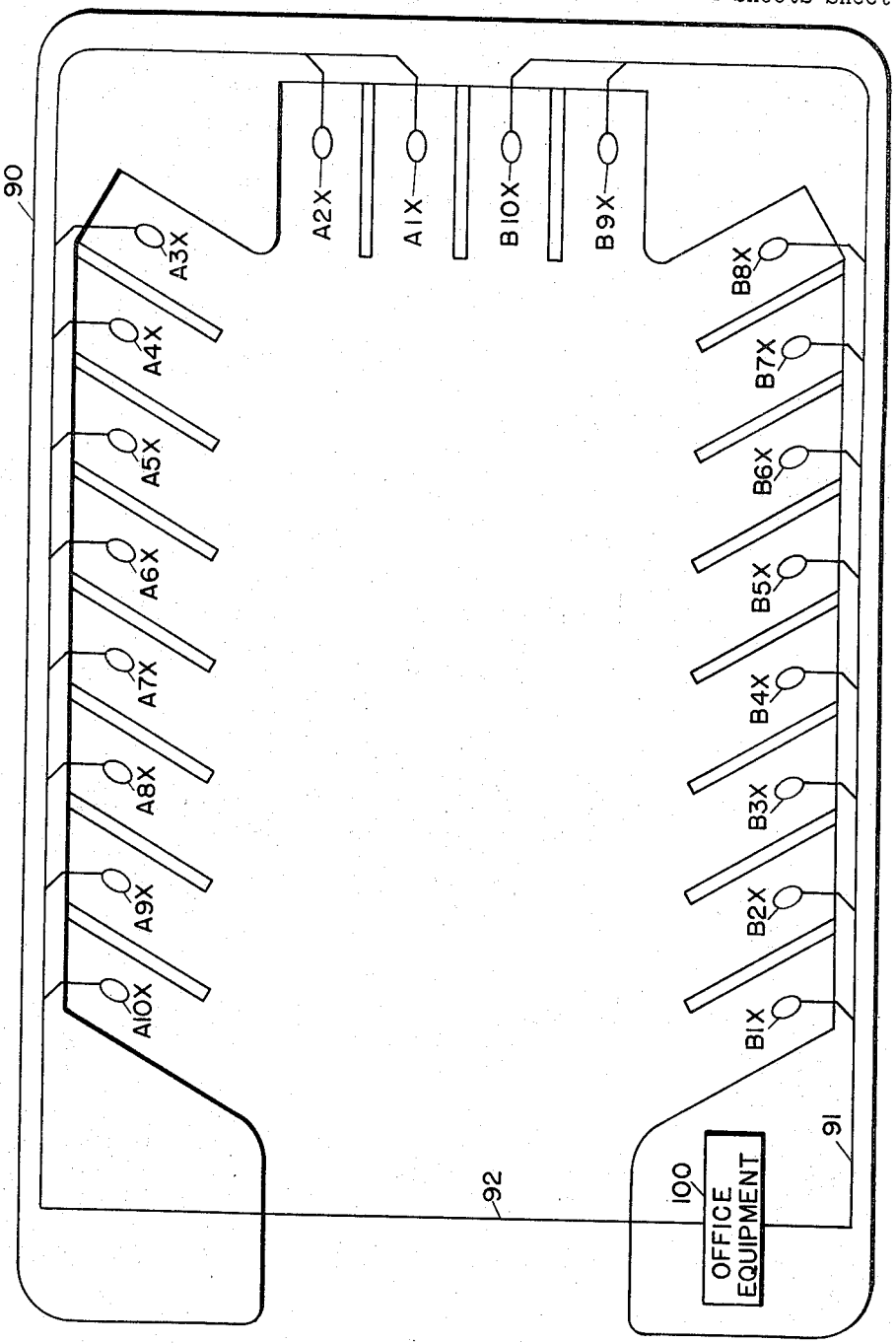
FIG. 1 is a plan view of a parking facility utilizing the invention.

Turning now to FIG. 1, there is shown a parking facility 90 having separate transducer units monitoring occupancy for each individual space or stall within the facility. A first plurality of transducer units B1X–B10X is coupled to office equipment 100 through a separate cable 91, while a second plurality of transducer units A1X–A10X is coupled to office equipment 100 through another cable 92.

Figure 2:
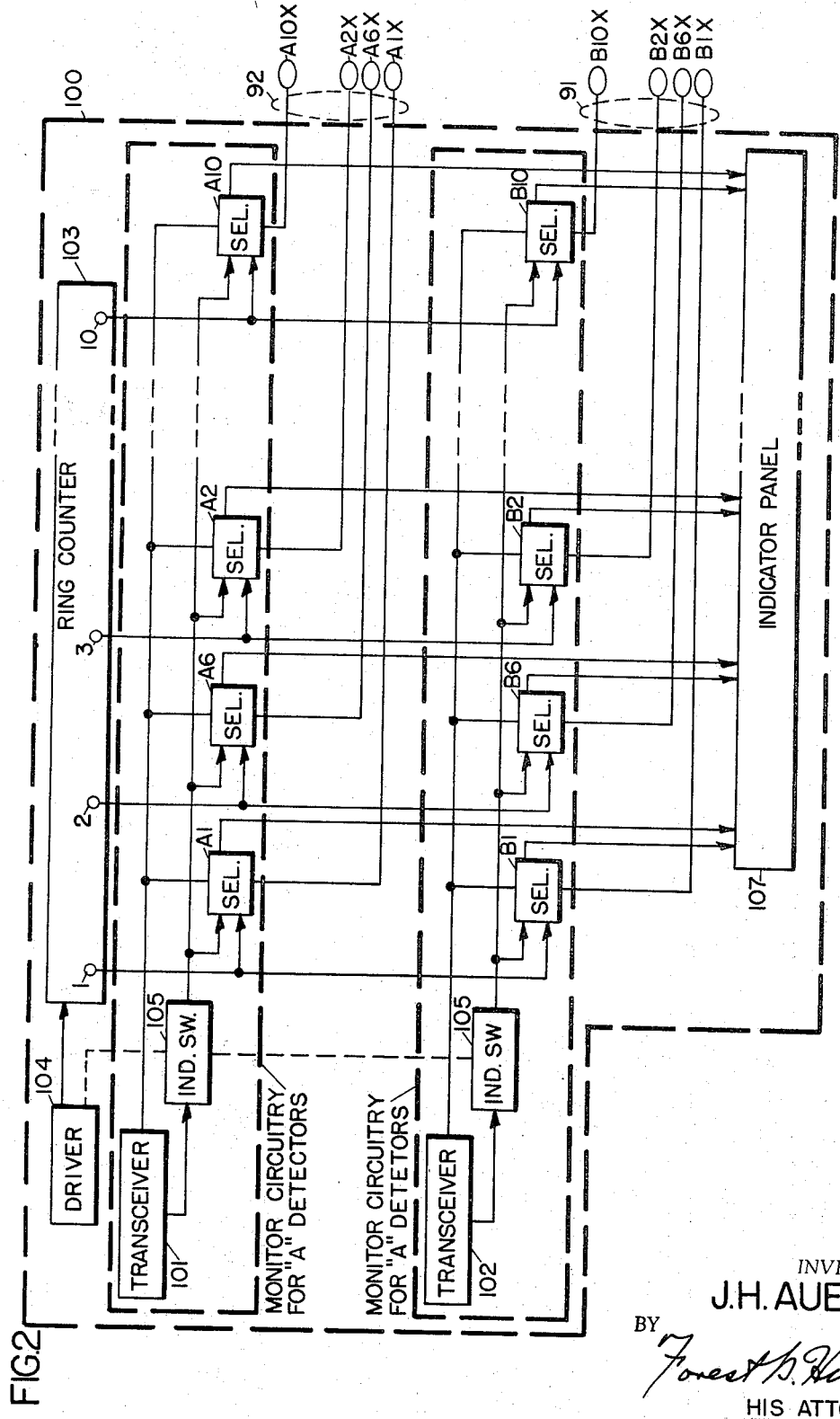
FIG. 2 is a block diagram of the scanning system.

Turning next to FIG. 2, there is shown a block diagram of office equipment 100, which includes a pair of transceivers 101 and 102. Although but two transceivers are shown for simplicity, a much larger number may be utilized with the system. Moreover, the system is not limited to but ten transducer units per transceiver, since a larger number may be utilized, if desired. However, for simplicity, it is assumed that but ten transducer units are operated in combination with each transceiver.

The system includes a ten-stage ring counter 103. It should be noted that ten stages are chosen since each transceiver is assumed to scan ten parking spaces. In the event each transceiver is to scan a larger number of parking spaces, the number of required ring counter stages increases accordingly. The ring counter is driven by a driver circuit 104, which repetitively steps the counter through its operating cycles. In addition, the driver circuit operates a pair of indicator switching circuits 105 and 106 in parallel, each of which is associated respectively with transceiver 101 and 102.

Transceiver 101 is connected to each of a plurality of selector circuits A1–A10. Similarly, transceiver 102 is connected to a plurality of selector circuits B1–B10. Each selector circuit is actuated from ring counter 103. Thus, selector circuits A1 and B1 are simultaneously energized from the first stage of ring counter 103, selector circuits A6 and B6 are simultaneously energized from the second stage of ring counter 103, selector circuits A2 and B2 are simultaneously energized from the third stage of ring counter 103, and so on, through selector circuits A10 and B10, which are simultaneously energized from the tenth stage of ring counter 103. Cables 92 and 91 respectively couple circuits A1 and B1 to transducer units A1X and B1X respectively, selector circuits A6 and B6 to transducer units A6X and B6X respectively, selector circuits A2 and B2 to transducer units A2X and B2X respectively, and so on, through selector circuits A10 and B10, which are coupled to transducer units A10X and B10X, respectively. In addition, a first indicator switch 105 is coupled through selector switches A1-A10 to an indicator panel 107, while a second indicator switch 106 is coupled through selector circuits B1-B10 to indicator panel 107.

In operation, as driver 104 steps ring counter 103 through its pattern of counts, a separate transducer unit in group A1X-A10X is coupled to transceiver 101, and simultaneously a separate transducer unit in group B1X-B10X is coupled to transceiver 102. This takes places during the first half of each cycle produced by driver 104. During the second half of each driver cycle, indicator switches 105 and 106, being coupled to the outputs of transceivers 101 and 102, respectively, provide an indication signal to indicator panel 107 through the energized A and B selector circuits, respectively. In this fashion, each step of ring counter 103 couples the transceivers to separate transducer means, and provides separate indications through the energized selector circuits to indicator panel 107. The indicator panel maintains the indication supplied thereto for each transducer unit throughout each complete cycle of ring counter operation.

It should be noted that ring counter 103 couples the transducer units to the transceivers in a pattern which precludes successive energization of adjacent transducer units. This eliminates any interference due to ultrasonic pulses generated from adjacent transducers, such as might occur in the event multiple echoes should remain at sufficiently high amplitude for a given length of time, without substantial degeneration. By retaining the indications on indicator panel 107, an attendent may ascertain at a glance the occupancy of each stall in the parking facility, and needn't continually attempt to follow the pattern by which the parking spaces are sensed.

Figure 3:
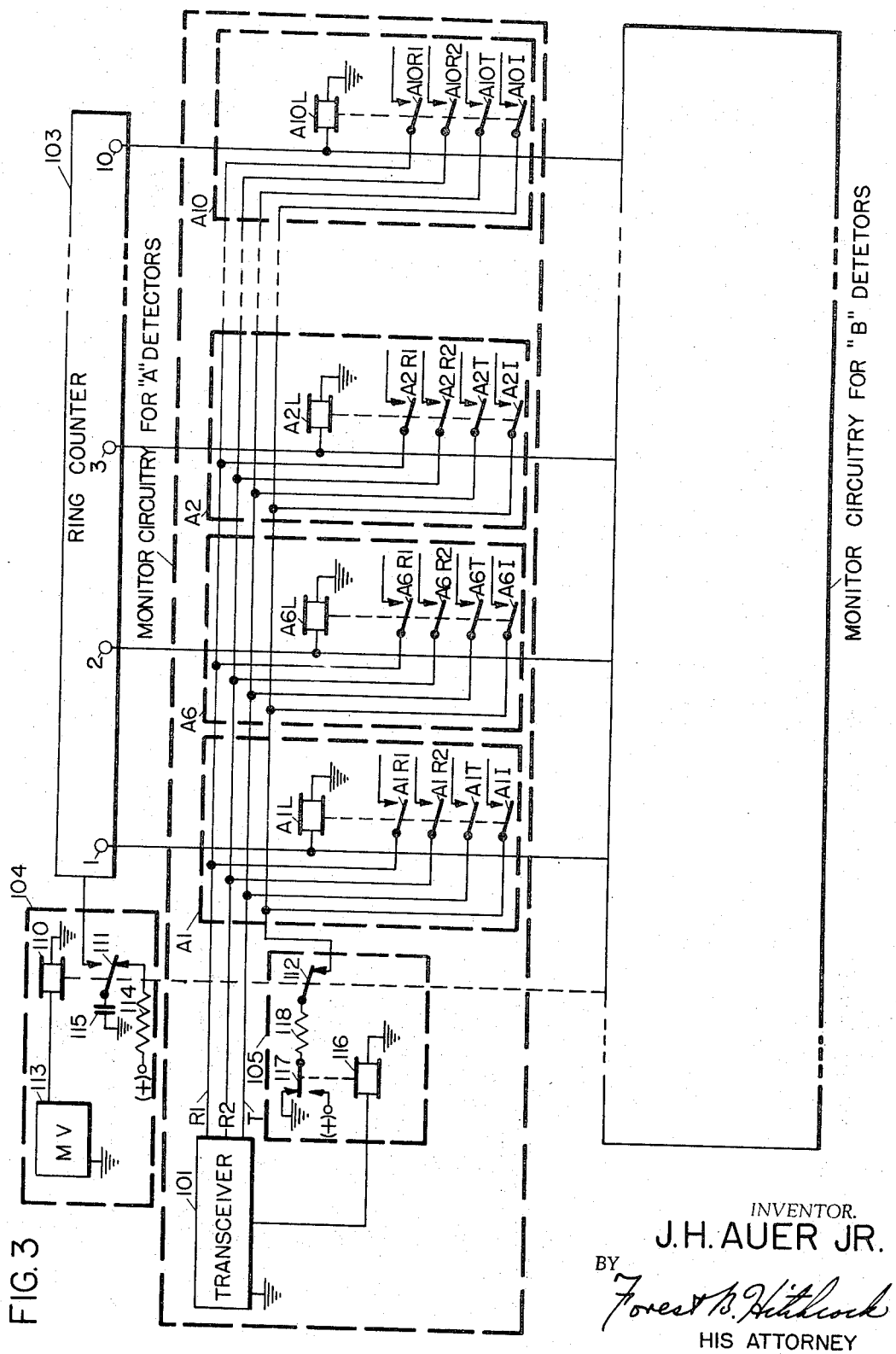
FIG. 3 is a part schematic and part block diagram of a portion of the scanning system.

Turning now to FIG. 3, there is shown detailed circuitry for operation of the scanning system. Driver circuit 104 comprises a relay 110 driven by a free-running multivibrator 113. Associated with relay 110 are a pair of contacts 111 and 112. Back contact 111 is coupled to a resistor 114, while the heel of contact 111 is coupled to a capacitor 115. Front contact 111 is coupled to ring counter 103.

Indicator switch 105 comprises a relay 116, driven by output signals from transceiver 101. Associated with relay 116 is a contact 117. A current-limiting resistor 118 is coupled between the heels of contacts 117 and 112. Back contact 117 is coupled to a source of positive voltage, while front contact 117 is grounded.

Each of selector circuits A1-A10 comprises a relay having four contacts. For example, selector circuit A1 comprises a relay A1L which is driven by the first output stage of ring counter 103, selector circuit A6 comprises a relay A6L which is driven by the second output stage of ring counter 103, and so on. Leads R1 and R2, coupled to the receiver portion of transceiver 101, are connected respectively to a pair of front contacts A1R1 and A1R2 of relay A1L when relay A1L is energized, to a pair of front contacts A6R1 and A6R2 of relay A6L when relay A6L is energized, and so on. Similarly, lead T, carrying output signals from the transmitter portion of transceiver 101, is connected to a front contact A1T of relay A1L when relay A1L is energized, to a front contact A6T of relay A6L when relay A6L is energized, and so on. Similarly, back contact 112 of relay 110 is connected to a front contact A1I of relay A1L when relay A1L is energized, to a front contact A6I of relay A6L when relay A6L is energized, and so on.

Front contacts A1R1 and A1R2 are coupled to the receiving transducer portion of transducer unit A1X, while front contact A1T is coupled to the transmitting transducer portion of transducer unit A1X. Similarly, front contacts A6R1 and A6R2 are coupled to the receiving transducer portion of transducer unit A6X, while front contact A6T is coupled to the transmitting transducer portion of transducer unit A6X, and so on. In addition, front contact A1I is coupled to the indicator means for indicating the condition sensed by transducer unit A1X, A6I is coupled to the indicator means for indicating the condition sensed by transducer unit A6X, and so on. It should be noted that the monitor circuitry for the B detectors, which includes transceiver 102, indicator switch 106 and selector circuits B1-B10, as shown in FIG. 2, is identical to the monitor circuitry for the A detectors, which includes transceiver 101, indicator switch 105 and selector circuits A1-A10, as shown in FIG. 3.

Operation of the circuitry shown in FIG. 3 occurs as follows: Each output pulse of multivibrator 113 energizes relay 110, closing front contact 111 and opening back contact 112. Between each output pulse produced by the multivibrator there is a period of zero signal. During this interval, relay 110 is deenergized, closing back contacts 111 and 112. When back contact 111 is closed, capacitor 15 acquires a charge; when relay 110 is energized, the charge on capacitor 115 is supplied to ring counter 103, causing the ring counter to advance its count by one step. In this fashion, each actuation of relay 110 steps the ring counter to its next successive count.

Assume that relay 116 is deenergized when the receiver portion of transceiver 101 receives a signal indicative of a vehicle detection. During each interval in which relay 110 is energized, there is no effect upon contacts A1I, A6I, etc. since back contact 112 is open. However, during the interval in which relay 110 is deenergized, a positive output voltage appears on front contact A1I when relay A1L is energized, on front contact A6I when relay A6L is energized, and so on, assuming that relay 116 is deenergized. However, when relay 116 is energized, during each interval in which relay 110 is deenergized, ground potential is supplied to front contact A1I when relay A1L is energized, front contact A6I when relay A6L is energized, etc.

The sequence of events required in order to energize front contacts A1I, A6I, etc. occurs as follows. Relay 110 is energized, advancing the count of ring counter 103 by one step. Assume that this advance has taken place from step 10 to step 1. Relay A1L is therefore energized. During occurrence of each entire pulse produced by multivibrator 113, relay 110 remains energized, and front contact A1I receives no signal. Moreover, during this interval, relay 116 assumes either its energized or deenergized condition, depending upon whether the parking stall sensed by transducer unit A1X is vacant or occupied, respectively. However, during the second half cycle of multivibrator 113 operation, relay 110 is deenergized, closing back contact 112. This provides either positive voltage or zero voltage to the indicator lead connected to front contact A1I. When multivibrator 113 next energizes relay 110, relay A1L is deenergized and relay A6L is energized. During this second interval in which relay 110 is energized, transceiver 101 responds to the condition sensed by transducer unit A6X, and relay 116 is operated accordingly, deenergizing in the event the parking stall sensed by transducer unit A6X is occupied and energizing in the event the stall sensed by transducer unit A6X is vacant. During the next successive half cycle of operation of multivibrator 113, relay 110 deenergizes, closing back contact 112 and thereby energizing front contact A6I with either positive or zero voltage, depending upon whether transducer unit A6X has sensed an occupied or vacant space, respectively. In this fashion, scanning of all parking spaces within the parking facility is readily achieved.

Figure 4:
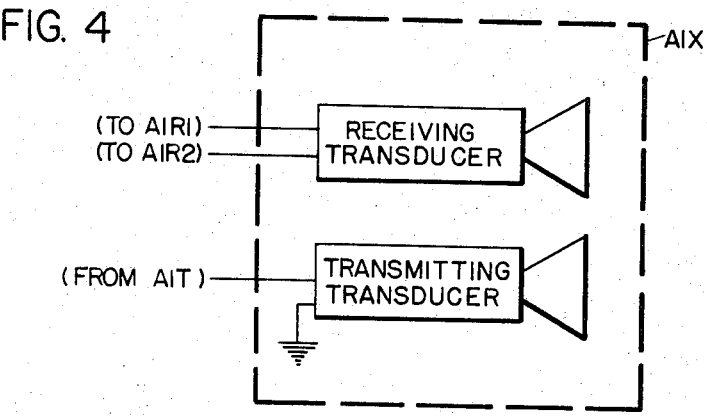
FIG. 4 is a block diagram illustrating typical connections for transducer units used in the system.

FIG. 4 is a block diagram designating lead conections to transducer unit A1X. Front contact A1R1 and A1R2, shown in FIG. 3, are coupled to the receiving transducer portion of transducer unit A1X, while front contact A1T, shown in FIG. 3, is coupled to the transmitting transducer portion of the transducer unit. Because the reflected signals sensed by the receiving transducer are, of necessity, extremely weak, the gain of the receiver portion of the transceiver coupled thereto is necessarily quite high. Therefore, the receiver portion may be extremely sensitive to stray pick-up. For this reason, it is desirable to open both leads between the transceiver and each receiving transducer when it is not desired to receive any signals from the receiving transducer at the transceiver.

Those skilled in the art will recognize that it is not essential to utilize separate transducers to perform the receiving and transmitting functions. A single transducer may adequately perform both functions in a manner similar to that described in the aforementioned Kendall et al. Patent 3,042,899. Such system may be found even more economically feasible, since but a single pair of conductors are connected to each transducer from the office equipment, eliminating need for the R2 lead. Moreover, the required number of transducers is halved.

Figure 5:
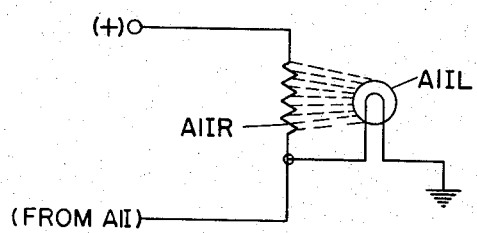
FIG. 5 is a schematic diagram of one type of indicator means especially adaptable for use in the scanning system.

FIG. 5 is a schematic diagram of the indicator means used in conjunction with transducer unit A1X. A similar circuit is associated with each of the other transducer units in the system. Indicator light A1IL, indicative of the condition sensed by transducer unit A1X is mounted on indicator panel 107 of FIG. 2, and a similar indicator lamp is mounted on the panel for each of the other transducer means in the system.

Lamp A1IL is energized with positive voltage through a photosensitive resistor A1IR in series with the lamp. Front contact A1I, shown in FIG. 3, is connected to a point common to resistor A1IR and lamp A1IL. Hence, energization of front contact A1I with positive voltage causes lamp A1IL to light. Some of the illumination produced by lamp A1IL is directed toward photosensitive resistor A1IR, causing a drastic decrease in the ohmic value of the resistor. Hence, positive energy supplied to one side of the photosensitive resistor is sufficient to maintain lamp A1IL in its illuminated condition, even though positive energy is subsequently removed from front contact A1I. In this fashion, lamp A1IL remains lit after relay 110 of FIG. 3 is energized subsequent to energization of relay A1L. Moreover, subsequent deenergization of relay A1L leaves lamp A1IL in its illuminated condition.

After ring counter 103 has stepped through its entire cycle of operation, relay A1L is again energized. Relay 116 of FIG. 3 then responds to the condition sensed by transducer unit A1L. If the parking stall sensed by transducer unit A1X remains occupied, relay 116 is deenergized, and when relay 110 subsequently deenergizes, positive potential is supplied to front contact A1I of relay A1L, and lamp A1IL remains continuously lit. On the other hand, if the parking stall sensed by transducer unit A1X is vacant, relay 116 is energized when relay A1L is energized. Thus, subsequent deenergization of relay 110 supplies ground potential to front contact A1I. Under these conditions, only ground potential exists across lamp A1IL, and the lamp is turned off. This removes illumination from photosensitive resistor A1IR, causing a large increase in ohmic value of the resistor. Thus, subsequent energization of relay 110 and consequential deenergization of relay A1L leaves lamp A1IL in its dark condition, since insufficient energy reaches lamp A1IL through photosensitive resistor A1IR to illuminate the lamp. Hence the lamp remains dark until ring counter 103 again steps through its entire cycle of operation and relay A1L is again energized, at which time transducer unit A1X again senses the condition of the parking stall which it monitors. If the stall has remainder vacant, lamp A1IL remains dark; however, if the stall has become occupied, lamp A1IL is again illuminated, as previously described.

Thus, there has been shown a system for scanning parking spaces within a parking facility using a plurality of ultrasonic transducers with but a minimum of transceivers. The system enables repetitive scanning of all parking spaces within the parking facility through timesharing of one or more ultrasonic transceivers by a plurality of ultrasonic transducers. The system enables highly economical and accurate monitoring of all parking spaces within the parking facility.

Although but one embodiment of the invention has been described, it is to be specifically understood that this form is selected to facilitate in disclosure of the invention rather than to limit the number of forms which it may assume. For example, it would be feasible to utilize the scanning system described herein with other forms of transducers, such as photoelectric or magnetic. Various other modifications and adaptations may be applied to the specific form of the invention shown to meet requirements of practice, without in any manner departing from the spirit or scope of the invention.

What is claimed is:

1. Means for periodically scanning a plurality of parking spaces in a predetermined pattern within a parking facility comprising, a plurality of transmitting and receiving transducer units, each transmitting and receiving transducer unit being situated to monitor a single parking space, a single transceiver adapted to operate in combination with any single transmitting and receiving transducer unit at any given instant, and a plurality of switching circuit means each adapted to be energized in turn in a repetitive pattern, and each switching circuit being effective when energized to couple a particular one of said transmitting and receiving transducer units to said transceiver.

2. The means for periodically scanning the plurality of parking spaces of claim 1 including a plurality of indicators, each of said switching circuits being coupled to a separate one of said indicators and supplying energy thereto in accordance with occupancy of said single parking space.

3. The means for periodically scanning a plurality of parking spaces of claim 1, wherein said transceiver is adapted to generate and receive electrical impulses of ultrasonic frequency, and said plurality of transmitting and receiving transducer units are adapted to emit and respond to vibrational energy impulses of ultrasonic frequency.

4. The means for periodically scanning the plurality of parking spaces of claim 3 including a plurality of indicators, each of said switching circuits being coupled to a separate one of said indicators and supplying power thereto in accordance with occupancy of said single parking space.

5. Means for periodically scanning a plurality of parking spaces within a parking facility comprising, a plurality of transmitting and receiving transducer units, each transmitting and receiving transducer unit being situated to monitor a single parking space, a single transceiver circuit adapted to operate in combination with any single transmitting and receiving transducer unit at any given instant, means for repetitively producing electrical impulses on a plurality of conductors in a predetermined pattern, and a plurality of switching circuits, each of said switching circuits being operatively connected to a separate one of said conductors and coupling a separate one of said transmitting and receiving transducer units to the transceiver in response to an electrical impulse on the conductor associated with said one switching circuit.

6. The means for periodically scanning the plurality of parking spaces of claim 5 including a plurality of indicators, each of said switching circuits being coupled to a separate one of said indicators and supplying power thereto in accordance with occupancy of said single parking space.

7. Means for periodically scanning a plurality of parking spaces within a parking facility comprising, a plurality of pairs of transmitting and receiving transducers, each pair of transmitting and receiving transducers being situated to monitor a single parking space, a single transceiver circuit adapted to operate in combination with any single pair of transmitting and receiving transducers at any given instant, a ring counter having a plurality of outputs, driver means coupled to said ring counter and repetitively operating said ring counter from one step to another, and a plurality of switching circuits, each of said switching circuits being operatively connected to a separate output of said ring counter and coupling said transceiver to a separate pair of transducers in response to a predetermined step condition of the ring counter.

8. The means for periodically scanning a plurality of parking spaces of claim 7 including a plurality of indicators, switching means responsive to said transceiver circuit and controllably supplying power in accordance with occupancy of said single parking space, means coupling said switching means to each of said switching circuits, and means coupling each of said switching circuits to a separate one of said indicators for supplying power thereto in accordance with occupancy of said single parking space.

9. The means for periodically scanning the plurality of parking spaces of claim 7, wherein said transceiver circuit is adapted to generate and receive electrical impulses of ultrasonic frequency, and said plurality of pairs of transmitting and receiving tranhducers are respectively adapted to emit and respond to vibrational energy impulses of ultrasonic frequency.

10. The means for periodically scanning the plurality of parking spaces of claim 8, wherein said transceiver circuit is adapted to generate and receive electrical impulses of ultrasonic frequency, and said plurality of pairs of transmitting and receiving transducers are respectively adapted to emit and respond to vibrational energy impulses of ultrasonic frequency.

11. Means for periodically scanning a plurality of parking spaces in a predetermined pattern within a parking facility comprising, a plurality of transmitting and receiving transducer units, each transmitting and receiving transducer unit being situated to monitor a single parking space, a single transceiver adapted to operate in combination with any single transmitting and receiving transducer unit at any given instant, and switching means operatively coupling each of said transmitting and receiving transducer units separately, in turn, to said transceiver in a repetitive pattern.

12. Means for periodically scanning a plurality of parking spaces within a parking facility comprising, a plurality of transmitting and receiving transducer units, each transducer unit being situated to monitor a single parking space, a single transceiver circuit adapted to operate in combination with any transmitting and receiving transducer unit at any given instant, a ring counter having a plurality of outputs, driver means coupled to said ring counter and repetitively operating said ring counter from one step to another, and a plurality of switching circuits, each of said switching circuits being operatively connected to a separate output of said ring counter and coupling said transceiver to a separate transducer unit in response to a predetermined step condition of the ring counter.

13. The means for periodically scanning a plurality of parking spaces of claim 12 including a plurality of indicators, switching means responsive to said transceiver circuit and controllably supplying power in accordance with occupancy of said single parking space, means coupling said switching means to each of said switching circuits, and means coupling each of said switching circuits to a separate one of said indicators for supplying power thereto in accordance with occupancy of said single parking space.

14. The means for periodically scanning the plurality of parking spaces of claim 12 wherein said transceiver circuit is adapted to generate and receive electrical pulses of ultrasonic frequency, and said transducer units are adapted to emit and respond to vibrational energy impulses of ultrasonic frequency.

15. The means for periodically scanning the plurality of parking spaces of claim 13 wherein said transceiver circuit is adapted to generate and receive electrical pulses of ultrasonic frequency, and said transducer units are adapted to emit and respond to vibrational energy impulses of ultrasonic frequency.

References Cited

UNITED STATES PATENTS 3,114,128  12/1963  Ljungman et al. _____ 340—51

JOHN W. CALDWELL, *Primary Examiner.*

NEIL C. READ, THOMAS B. HABECKER,
*Examiners.*

ALVIN H. WARING, *Assistant Examiner.*